United States Patent
Friedman et al.

(10) Patent No.: US 12,212,504 B2
(45) Date of Patent: Jan. 28, 2025

(54) TECHNIQUES TO USE DESCRIPTORS FOR PACKET TRANSMIT SCHEDULING

(71) Applicant: Intel Corporation, Santa Clara, CA (US)

(72) Inventors: Ben-Zion Friedman, Jerusalem (IL); Noam Elati, Zichron yaakov (IL); Sarig Livne, Schanya (IL)

(73) Assignee: Intel Corporation, Santa Clara, CA (US)

( * ) Notice: Subject to any disclaimer, the term of this patent is extended or adjusted under 35 U.S.C. 154(b) by 940 days.

(21) Appl. No.: 16/260,785

(22) Filed: Jan. 29, 2019

(65) Prior Publication Data

US 2019/0158429 A1 May 23, 2019

(51) Int. Cl.
| | |
|---|---|
| *H04L 49/253* | (2022.01) |
| *H04L 41/06* | (2022.01) |
| *H04L 43/16* | (2022.01) |
| *H04L 49/90* | (2022.01) |
| *H04L 49/901* | (2022.01) |

(52) U.S. Cl.
CPC ............ *H04L 49/254* (2013.01); *H04L 41/06* (2013.01); *H04L 43/16* (2013.01); *H04L 49/901* (2013.01); *H04L 49/9068* (2013.01)

(58) Field of Classification Search
CPC ....... H04L 49/254; H04L 41/06; H04L 43/16; H04L 49/901; H04L 49/9068
See application file for complete search history.

(56) References Cited

U.S. PATENT DOCUMENTS

| | | | | |
|---|---|---|---|---|
| 6,081,848 | A * | 6/2000 | Grun | H04L 49/90 710/1 |
| 6,247,060 | B1 * | 6/2001 | Boucher | H04L 49/9094 709/230 |
| 6,567,859 | B1 * | 5/2003 | Yang | H04L 49/9073 709/225 |
| 6,701,393 | B1 * | 3/2004 | Kemeny | G06F 12/124 711/E12.071 |
| 6,754,222 | B1 * | 6/2004 | Joung | H04Q 11/0478 370/415 |
| 6,956,818 | B1 * | 10/2005 | Thodiyil | H04L 47/50 370/395.42 |
| 7,289,440 | B1 * | 10/2007 | Beshal | H04L 47/30 370/236 |
| 7,724,740 | B1 * | 5/2010 | Wang | G06F 15/167 370/392 |
| 10,445,295 | B1 * | 10/2019 | Han | G06F 16/1844 |
| 2002/0053003 | A1 * | 5/2002 | Brandin | G06F 7/02 711/108 |
| 2004/0030840 | A1 * | 2/2004 | Hesse | G06F 12/121 711/E12.07 |
| 2005/0138161 | A1 * | 6/2005 | McDaniel | H04L 49/901 709/223 |

(Continued)

*Primary Examiner* — Chris Parry
*Assistant Examiner* — Dixon F Dabipi
(74) *Attorney, Agent, or Firm* — Compass IP Law PC

(57) ABSTRACT

Techniques to use descriptors for packet transmit scheduling include grouping a plurality of data descriptors associated with blocks of data with a single descriptor. The single descriptor to include information related to the plurality of data descriptors. The single descriptor to be used to schedule transmission of the blocks of data from a computing platform.

25 Claims, 11 Drawing Sheets

(56) References Cited

U.S. PATENT DOCUMENTS

| | | | |
|---|---|---|---|
| 2005/0223382 A1* | 10/2005 | Lippett | G06F 9/50 |
| | | | 718/103 |
| 2005/0249228 A1* | 11/2005 | Cornett | H04L 49/9042 |
| | | | 370/428 |
| 2006/0106946 A1* | 5/2006 | Agarwal | H04L 69/166 |
| | | | 709/250 |
| 2008/0089353 A1* | 4/2008 | Dunets | H04L 49/3018 |
| | | | 370/415 |
| 2008/0140877 A1* | 6/2008 | Baba | G06F 9/5011 |
| | | | 710/23 |
| 2009/0006765 A1* | 1/2009 | Friedman | H04L 49/9047 |
| | | | 711/141 |
| 2009/0172178 A1* | 7/2009 | Vasudevan | H04L 49/90 |
| | | | 709/230 |
| 2016/0127276 A1* | 5/2016 | Wu | H04L 43/12 |
| | | | 709/224 |

\* cited by examiner

Doorbell Format 400

| Tail 410 | Doorbell Type 420 | Data Length 430 | Number of Pkts. 440 | QD Completed 450 |

FIG. 4

| Type 510 | Descriptors 520 | Data Length 530 | Number of Pkts. 540 | Expire Time Stamp 550 | Time Stamp Drop Flag 560 |

QD Format 500

CAUSE, AT CIRCUITRY FOR A COMPUTING PLATFORM, A FIRST PLURALITY OF DATA DESCRIPTORS TO BE SEPARATELY STORED TO INDIVIDUAL MEMORY ADDRESS SLOTS OF A FIRST QUEUE MAINTAINED IN SYSTEM MEMORY OF THE COMPUTING PLATFORM, THE FIRST PLURALITY OF DATA DESCRIPTORS SEPARATELY ASSOCIATED WITH FIRST BLOCKS OF DATA
802

GROUP THE FIRST PLURALITY OF DATA DESCRIPTORS WITH A FIRST DESCRIPTOR, THE FIRST DESCRIPTOR TO INCLUDE INFORMATION TO INDICATE A NUMBER OF DATA DESCRIPTORS GROUPED WITH THE FIRST DESCRIPTOR, A CUMULATIVE DATA LENGTH OF THE FIRST BLOCKS OF DATA AND A NUMBER OF PACKETS TO TRANSMIT THE FIRST BLOCKS OF DATA FROM THE COMPUTING PLATFORM
804

CAUSE THE FIRST DESCRIPTOR TO BE STORED TO A FIRST MEMORY ADDRESS SLOT OF A SECOND QUEUE MAINTAINED IN THE SYSTEM MEMORY
806

SEND, TO CIRCUITRY FOR A NIC COUPLED WITH THE COMPUTING PLATFORM, INFORMATION TO INDICATE TO THE CIRCUITRY FOR THE NIC HOW TO OBTAIN THE FIRST DESCRIPTOR FROM THE FIRST MEMORY ADDRESS SLOT OF THE SECOND QUEUE
808

RECEIVE, AT CIRCUITRY FOR A NIC COUPLED WITH A COMPUTING PLATFORM, INFORMATION TO INDICATE HOW TO OBTAIN A FIRST DESCRIPTOR FROM A FIRST MEMORY ADDRESS SLOT OF A FIRST QUEUE MAINTAINED IN SYSTEM MEMORY OF THE COMPUTING PLATFORM, THE FIRST DESCRIPTOR GROUPED WITH A FIRST PLURALITY OF DATA DESCRIPTORS STORED IN A SECOND QUEUE MAINTAINED IN THE SYSTEM MEMORY, THE FIRST PLURALITY OF DATA DESCRIPTORS SEPARATELY ASSOCIATED WITH FIRST BLOCKS OF DATA, THE FIRST DESCRIPTOR TO INCLUDE INFORMATION TO INDICATE A NUMBER OF DATA DESCRIPTORS GROUPED WITH THE FIRST DESCRIPTOR, A CUMULATIVE DATA LENGTH OF THE FIRST BLOCKS OF DATA AND A NUMBER OF PACKETS TO TRANSMIT THE FIRST BLOCKS OF DATA FROM THE COMPUTING PLATFORM
902

OBTAIN THE FIRST DESCRIPTOR FROM THE FIRST QUEUE BASED ON THE RECEIVED INFORMATION
904

SCHEDULE TRANSMISSION OF THE FIRST BLOCKS OF DATA FROM THE COMPUTING PLATFORM BASED ON INFORMATION INCLUDED IN THE FIRST DESCRIPTOR
906

FIG. 9

Storage Medium 1000

Computer Executable Instructions for 800

Computer Executable Instructions for 900

*FIG. 10*

TECHNIQUES TO USE DESCRIPTORS FOR PACKET TRANSMIT SCHEDULING

TECHNICAL FIELD

Descriptions are generally related to scheduling packets for transmission from a computing platform.

BACKGROUND

A computing platform such as a server coupled to a network may include a network interface card (NIC) having circuitry or logic to schedule transmission of packets of data from the server. The server may be included as part of a communication network or part of a large data center. In some examples, the server may be deployed in a base station or Node B (e.g., base station transceiver (BTS)) or in other network access roles. In examples where the server is deployed as a BTS, communication applications executed by the BTS may require accurate and timely scheduling with as low as possible burstiness. Also, the communication applications may also require fairness scheduling algorithms such as weighted fair queuing that have as low as possible jitter. A server deployed in BTS may have substantially more transmit queues than a servers deployed in other network access roles.

BRIEF DESCRIPTION OF THE DRAWINGS

FIG. 4 illustrates an example doorbell format.
FIG. 5 illustrates an example quanta descriptor format.
FIG. 8 illustrates an example first logic flow.
FIG. 9 illustrates an example second logic flow.
FIG. 10 illustrates an example storage medium.

DETAILED DESCRIPTION

In some examples, a server or computing platform may include a network interface circuitry such as, but not limit to, a NIC. The NIC may include logic and/or features to perform at least some analysis associated with scheduling transmission of packets from the server or computing platform over a network. The scheduling may be based, at least in part, on transmit queues used to temporarily store data to be transmitted via packets to a destination. Traditionally, a full packet descriptor for each packet to be transmitted was fetched to facilitate the analysis. Thus, packet size accuracy was able to be maintained due to the full packet descriptor indicating each packet's length prior to scheduling. This traditional method of packet scheduling works well when the number of transmit queues are small (e.g., less than 10) and/or data transmission rates are low.

According to some examples, communication applications executed by a BTS may require a large number of transmit queues primarily due to the a large number of users serviced by a given BTS (e.g., substantially more than 10). Also, transmission rates for packets transmitted from a server deployed in a BTS may be high. The large number of queues and high transmission rates does not scale well with the traditional method of fetching a full packet descriptor. Also, solutions that involve scheduling packets for transmission knowing only a ruff estimation of packet data sizes and numbers of packets to be transmitted may lead to burstiness. For example, when a series of small packet data sizes are transmitted along with random large packet data sizes. Other solutions, such as including a very large memory buffer on a NIC to temporarily store full packet descriptors for use in scheduling may add an unacceptable level of cost and/or complexity to packet scheduling by logic and/or features of a NIC.

Figure 1:
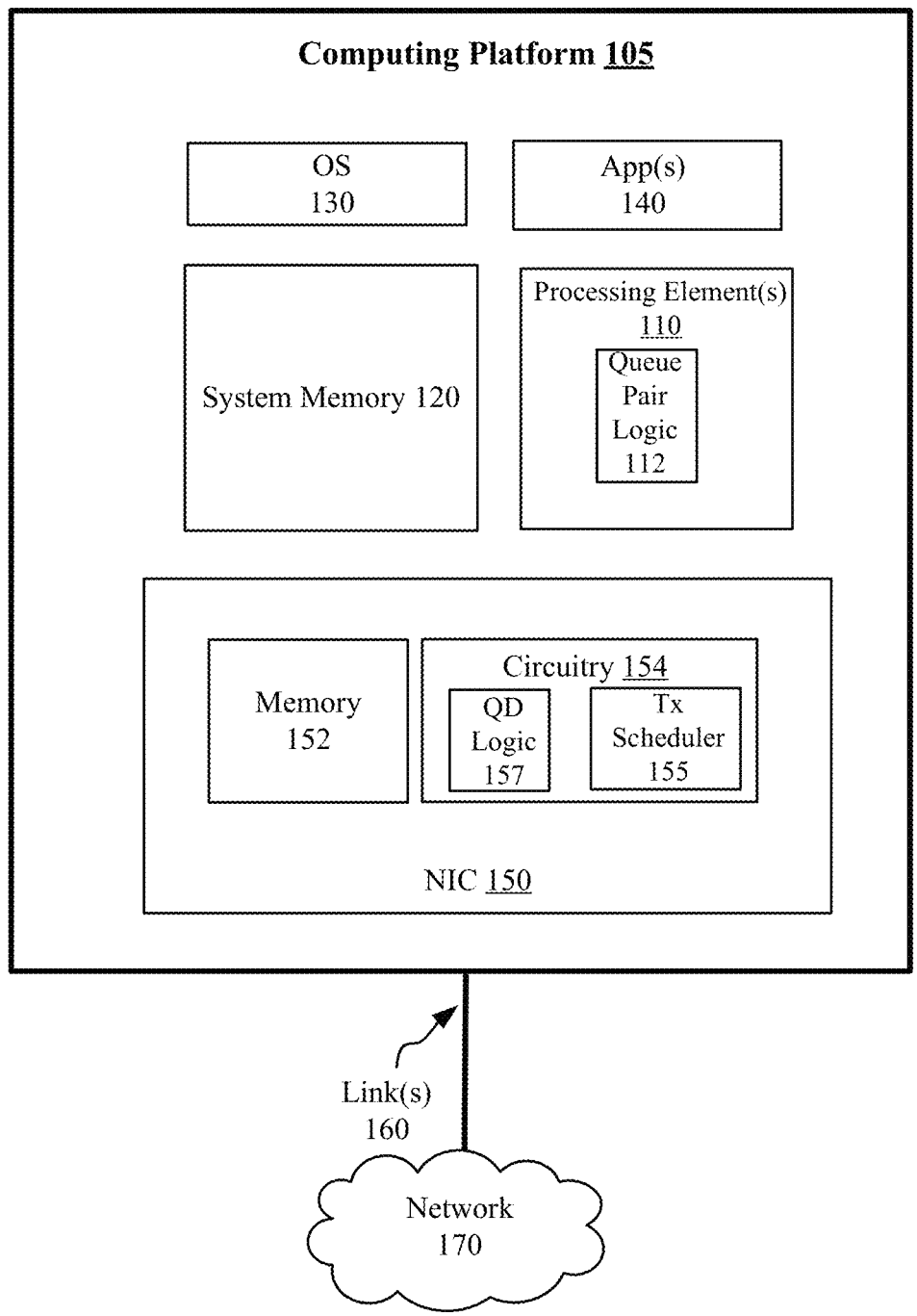
FIG. 1 illustrates an example first system.

FIG. 1 illustrates an example system 100. In some examples, as shown in FIG. 1, system 100 includes a computing platform 105 coupled with a network 170 via one or more links 160. Also, as shown in FIG. 1, computing platform 105 may include processing element(s) 110, a host or system memory 120, an operating system (OS) 130, one or more applications (App(s)) 140 or a NIC 150.

According to some examples, NIC 150 includes circuitry 154 to support a transmit (Tx) scheduler 155 or a quanta descriptor (QD) logic 157 to facilitate scheduling of data to be transmitted from computing platform 105 through link(s) 160 via one or more packets. For these examples, descriptor data that describes respective blocks of data to be scheduled for transmission may be stored in a first queue included in system memory 120 (not shown in FIG. 1). Also, information associated with a grouping of descriptor data that separately describe individual blocks of data may be stored in a second queue in system memory 120 (not shown in FIG. 1). The information associated with the grouping of descriptor data may be referred to as a "quanta descriptor" or a "QD". As described in more detail below, individual QDs may be pulled from system memory 120 and temporarily stored at a memory 152 at NIC 150. For example, the individual QDs may be temporarily stored in a QD cache included in memory 152 (not shown in FIG. 1) and used for scheduling blocks of data for transmission via one or more packets transmitted through link(s) 160.

In some examples, as shown in FIG. 1, processing element(s) 110 may support or execute a queue pair logic 112. Queue pair logic 112 may be arranged to work in conjunction with QD logic 157 at NIC 150 to facilitate scheduling of transmission of blocks of data via one or more packets from computing platform 105. As described more below, queue pair logic 112 may include logic and/or features to provide information to QD logic 157 related to descriptor data or QD information at least temporally stored in the above-mentioned first and second queues included in system memory 120. Also, in some examples, queue pair logic 112 may be executed by processing element(s) 110 as a device driver for NIC 150 that may be a feature of OS 130. In other examples, QD logic 157 may be logic executed by an application specific integrated circuit (ASIC) or executed by a field programmable gate array (FPGA) included in processing element(s) 110.

According to some examples, elements of NIC 150, link(s) 160, or network 170 may utilize protocols and/or interfaces according to one or more Ethernet standards promulgated by the Institute of Electrical and Electronics Engineers (IEEE). For example, one such Ethernet standard promulgated by IEEE may include IEEE 802.3-2018, Carrier sense Multiple access with Collision Detection (CSMA/CD) Access Method and Physical Layer Specifications, Published in August 2018 (hereinafter "the IEEE 802.3 specification"). Although examples are not limited to protocols and/or interface used in accordance with the IEEE 802.3 specification, other or additional standards or specification may be utilized.

In some examples, computing platform 105 may be arranged as part of a server, a server array or server farm, a server for a base transceiver station (BTS), a web server, a network server, an Internet server, a work station, a minicomputer, a main frame computer, a supercomputer, a network appliance, a web appliance, a distributed computing system, multiprocessor systems, processor-based systems, or combination thereof.

According to some examples, processing element(s) 110 or circuitry 154 of NIC 150 may include various commercially available processors, including without limitation an AMD® Epyc®, Ryzen®, Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon® or Xeon Phi® processors; and similar processors. According to some examples, processing element(s) 110 or circuitry 154 may also include an application specific integrated circuit (ASIC) and at least some elements, logic and/or features of processing element(s) 110 or circuitry 154 may be implemented as hardware elements of an ASIC. According to some examples, processing element(s) 110 or circuitry 154 may also include an FPGA and at least some elements, logic and/or features of processing element(s) 110 or circuitry 154 may be implemented as hardware elements of the FPGA.

In some examples, system memory 120 may be composed of one or more memory devices or dies which may include various types of volatile and/or non-volatile memory. Also, memory 152 at NIC 150 may also include one or more memory devices or dies which may include various types of volatile and/or non-volatile memory. Volatile memory may include, but is not limited to, random-access memory (RAM), Dynamic RAM (D-RAM), double data rate synchronous dynamic RAM (DDR SDRAM), static random-access memory (SRAM), thyristor RAM (T-RAM) or zero-capacitor RAM (Z-RAM). Non-volatile memory may include, but is not limited to, non-volatile types of memory such as three-dimensional (3-D) cross-point memory. The non-volatile types of memory may be byte or block addressable and may include, but are not limited to, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other non-volatile memory types.

Figure 2:
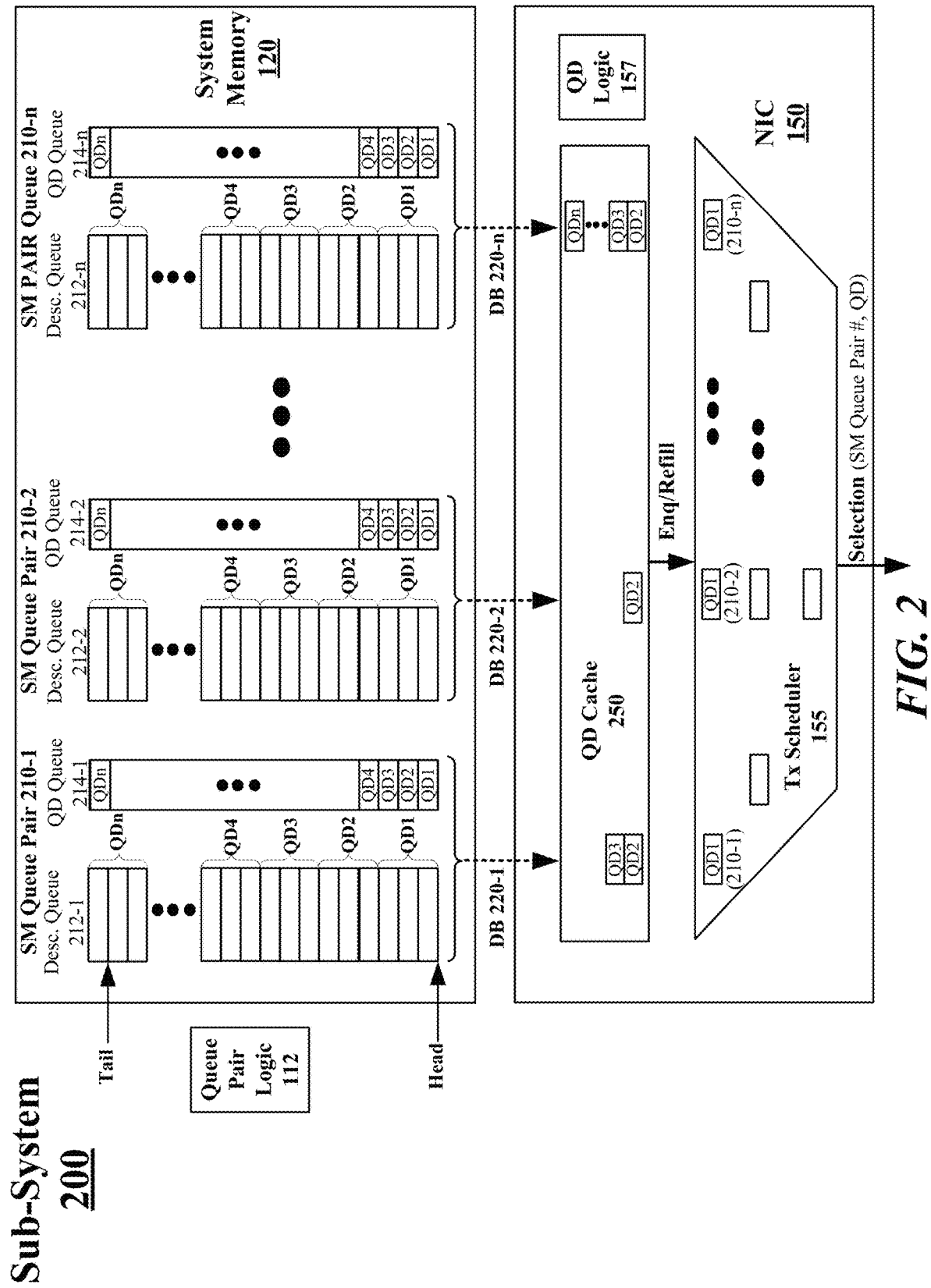
FIG. 2 illustrates an example sub-system.

FIG. 2 illustrates an example sub-system 200. According to some examples, sub-system 200 may a sub-system of system 100 shown in FIG. 1. For these examples, as shown in FIG. 2, sub-system 200 includes elements of system 100 such as queue pair logic 112, system memory 120, NIC 150 and QD logic 157.

In some examples, as shown in FIG. 2, system memory 120 includes system memory (SM) queue pairs 210-1 to 210-n, where "n" represents any whole, positive integer greater than 1. For these examples, SM queue pairs 210-1 to 210-n separately include respective descriptor queues 212-1 to 212-n and QD queues 214-1 to 214-n. A "head" may represent a first pointer to a first memory address or beginning point of data descriptors temporarily stored in descriptor queues 212-1 to 212-n included in respective SM queue pairs 210-1 to 210-n. A "tail" may represent a second pointer to a last memory address or ending point of data descriptors temporarily stored in these same respective descriptor queues. For ease of illustration, FIG. 1 shows head and tail pointers for only descriptor queue 212-1. However, descriptor queues 212-1 to 212-n may also include separate head and tail pointers. Although not shown in FIG. 2, separate head and tail pointers for separate QD queues among QD queues 214-1 to 214-n may represent respective beginning and last memory addresses for QDs temporarily stored in these separate QD queues.

According to some examples, SM queue pairs 210-1 to 210-n may be associated with transmit queues to transmit data via packets from a computing platform such as computing platform 105. Although not shown in FIG. 2, the transmit queues may be included in system memory 120. A data descriptor stored to a single memory address slot of one of descriptor queues 212-1 to 212-n may include information describing a block of data or data payload included in a packet to be scheduled for transmission from these transmit queues. For example, data payload size, memory storage address(es), source/destination network addresses, transmission protocols, traffic classes, priorities or other types of information that may be used to route the data payload included in a packet to a destination. In some examples, a single slot of descriptor queues 212-1 to 212-n may have a physical memory address capable of storing up to 16 bytes of descriptor data. Examples are not limited to 16 byte slots for descriptor queues 212-1 to 212-n.

In some examples, as shown in FIG. 2, multiple slots of descriptor queues 212-1 to 212-n may be associated with single memory address slots on respective QD queues 214-1 to 214-n. For example, the first three slots of descriptor queue 212-1 starting from the head pointer of descriptor queue 212-1 may be grouped and associated with QD1. Also, as shown in FIG. 2, the next three slots of descriptor queue 212-1 may be grouped with QD2 and so on. Examples are not limited to a grouping of three slots per QD. Any number of data descriptors may be associated with a given QD (e.g., 10, 20, 50, etc.). As described more below, information for respective QDs included in each slot of QD queues 214-1 to 214-n may include information for a plurality or grouping of data descriptors and that information may be used primarily or exclusively to facilitate scheduling transmission of data via one or more packets. This information may include, but is not limited to, a number of data descriptors grouped with a QD, a cumulative data length of the data associated with the grouped data descriptors, or a number of packets arranged to transmit the associated data. According to some examples, a single slot of QD queues 214-1 to 214-n may be a smaller size than the slot sizes for descriptor queues 212-1 to 212-n. For example, QD queues 214-1 to 214-n may have memory address slots capable of storing from 2 to 8 bytes compared to an example capacity of up to 16 bytes for memory address slots of descriptor queues 212-1 to 214-n. Examples are not limited to 16 bytes to 2-8 bytes comparable sizes.

According to some examples, as described more below, queue pair logic 112 may include logic and/or features to maintain SM queue pairs 210-1 to 210-n as well as respective head and tail pointers. Queue pair logic 112 may be part of or work in cooperation with software of computing platform 105 to maintain SM queue pairs 210-1 to 210-n. For example, queue pair logic 112 may be part of or work in cooperation with OS 130 (e.g., as a network interface device driver) or App(s) 140 to obtain data descriptor information for data to be transmitted from computing platform 105 via a packet and cause the data descriptor to be stored to a descriptor queue from among descriptor queues 212-1 to 212-*n*. Queue pair logic 112 may then group a plurality of data descriptors stored to the descriptor queues and generate a QD that includes information as indicated above as being included in QD queues 214-1 to 214-*n*. Queue pair logic 112 may then cause that information to be stored to a QD queue included in the SM queue pair that includes the descriptor queue in which the group or plurality of data descriptors were stored. For example, Queue pair logic 112 may group data descriptors stored to the first three slots of descriptor queue 212-1, generate the QD and cause the QD to be stored to the first slot of QD queue 214-1 shown in FIG. 2 as QD1.

In some examples, queue pair logic 112 may include logic and/or features to generate a doorbell to be sent to NIC 150 to indicate that a QD is being created or has been completed for an SM queue pair from among SM queue pairs 210-1 to 210-*n*. The doorbell may also include additional information, described more below, to enable QD information to be obtained from a QD queue from among QD queues 214-1 to 214-*n* that corresponds to the SM queue pair. QD logic 157 at NIC 150 may include logic and/or features to receive the doorbell and then obtain QD information from the QD queue based, at least in part, on the additional information included in the doorbell. For example, doorbell (DB) 220-1 may be generated by queue pair logic 112 and sent to QD logic 157. DB 220-1 may indicate that a QD is being created or has been completed for SM queue pair 210-1. QD logic 157 may obtain information included in the QD based on additional information included in DB 220 and then cause the obtained information for the QD to be at least temporarily maintained in a QD cache 250. For these examples, QD cache 250 may be included in memory 152 at NIC 150.

QD logic 157 may include logic and/or features to temporarily store obtained QD information to reduce latencies for feeding information for completed QDs to Tx schedular 155. In some examples, some SM queue pairs may be associated with transmit queues that have data scheduled for transmission at a lower frequency (hereafter referred to as "slow SM queue pairs") compared to other SM queue pairs associated with transmit queues that have data scheduled for transmission at a higher frequency (hereafter referred to as "fast SM queue pairs"). For these examples, QD logic 157 may cause information for more QDs for fast SM queue pairs to be stored to QD cache 250 compared to information for QDs stored for slow SM queue pairs. For example, as shown in FIG. 2, QD logic 157 may cause information for multiple QDs to be stored to QD cache 250 for SM queue pairs 210-1 and 210-*n*. Meanwhile only information for a single QD for SM queue pair 210-2 may be caused to be stored to QD cache 250 by QD logic 157. This discrepancy in number of QDs having information stored to QD cache 250 may be due to SM queue pairs 210-1 and 210-*n* being characterized as fast SM queue pairs and SM queue pair 210-2 being characterized as a slow SM queue pair.

According to some examples, logic and/or features of QD logic 157 may also work in collaboration with queue pair logic 112 to track QD states for a QD that are either incomplete (not all data descriptors received in descriptor queue 212-1 for slots associated with the QD) or completed (all data descriptors received). As briefly mentioned above, this tracking may be facilitated via use of doorbells sent by queue pair logic 112. In some examples, once an indication is received that a QD is complete, QD logic 157 may feed information for the completed QD to Tx scheduler 155. Tx scheduler 155 may select the SM queue pair for that QD for scheduling transmission of data from computing platform 105 (e.g., using a weighted fair queuing or round robin algorithm). Tx scheduler 155 may then use QD information such as a number of packets and data length for data to be transmitted to facilitate scheduling of transmission of the data from a transmit queue associated with the SM queue pair for that QD. For example, if QD1 for SM queue pair 210-1 is selected, then Tx scheduler 155 will use information included in QD1 to schedule transmission of data from a transmit queue associated with the grouped data descriptors for QD1 stored in SM queue pair 210-1.

In some examples, for every scheduling decision or selection by Tx scheduler 155, another QD may be fed to Tx scheduler 155 by QD logic 157. For these examples, a QD may either come from QDs stored in QD cache 250 or fetched directly from QD queues of SM queue pairs 210-1 to 210-*n* when no more QDs are available in QD cache 250. A QD fetch decision may be done by QD logic 157 for every scheduling event to determine whether to fetch from SM queue pairs 210-1 to 210-*n* (expensive operation in terms of latency) or not (use QD stored in QD cache 250). Every time a QD fetch decision is made to go to one of SM queue pairs 210-1 to 210-*n*, QD logic 157 choses how many QDs are fetched. For fast SM queue pairs (e.g., SM queue pair 210-*n*), more QDs are fetched and stored in QD cache 250. For slow SM queue pairs (e.g., SM queue pair 210-1), a minimal amount of QDs may be fetched and fed directly to Tx scheduler 155.

According to some examples, an amount of memory space allocated to QDs for SM queue pairs 210-1 to 210-*n* in QD cache 250 may be sized to contain a minimal amount of QDs required to fill up Tx scheduler 155's performance if QDs are selected using a selection algorithm (e.g., round robin) without a single QD Cache miss. In other words, the memory space allocated for QDs equals an amount of memory space to store QDs that can be selected for scheduling by Tx scheduler 155 within a single fetch latency.

In some examples, an amount of memory space allocated for QDs for individual SM queue pairs from among SM queue pairs 210-1 to 210-*n* in QD cache 250 may be sized to be able to provide full performance for Tx scheduler 155 scheduling transmission of data associated with a single SM queue pair without a single QD Cache miss. In other words, an amount of QDs for a given SM queue pair that can be selected for scheduling by Tx scheduler 155 within a single fetch latency.

Figure 3:
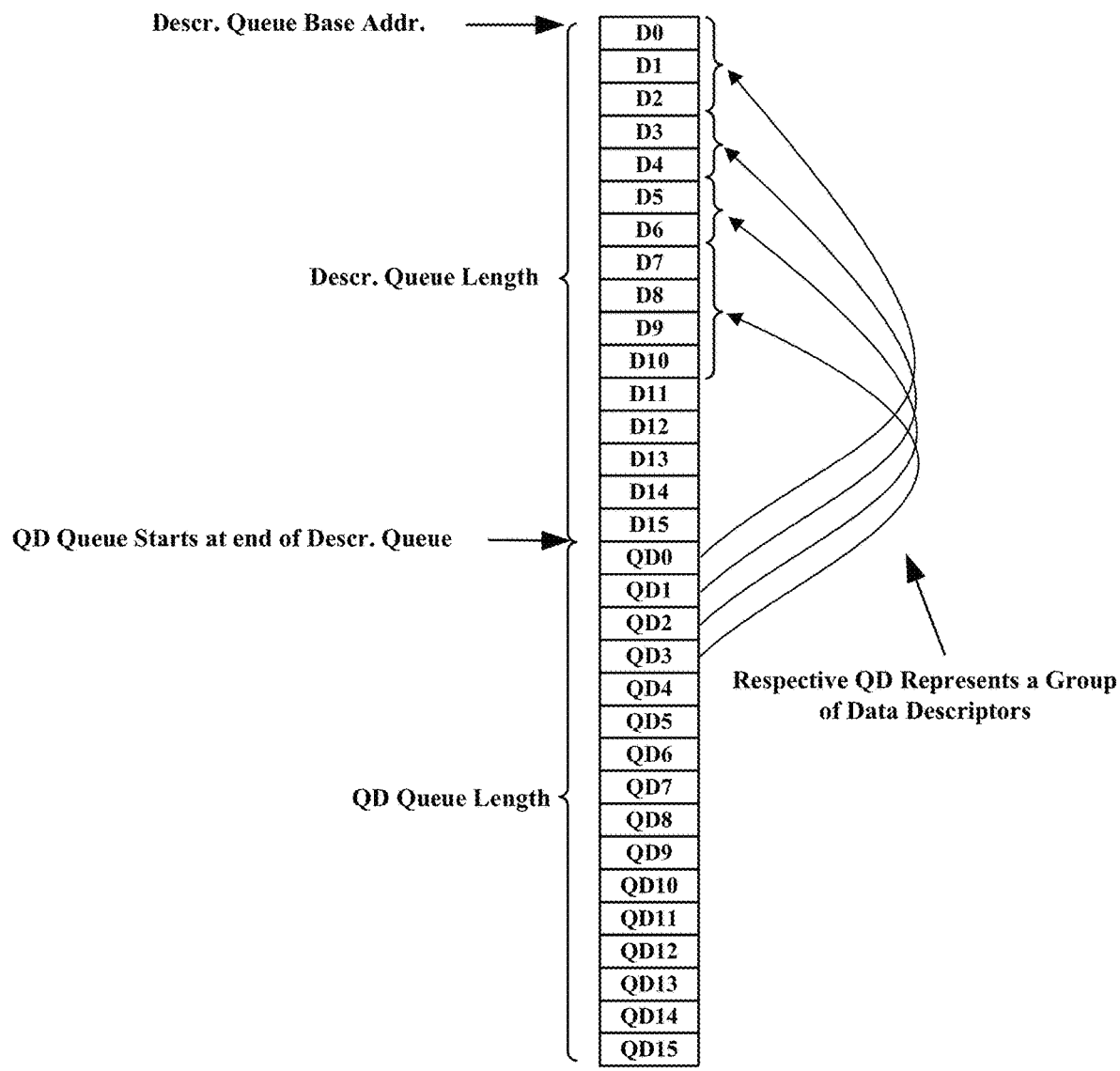
FIG. 3 illustrates an example system memory queue pair format.

FIG. 3 illustrates an example SM queue pair structure 300. In some examples, SM queue pair structure 300 may be an example structure to illustrate how a QD maintained or stored in a QD queue in system memory may include a grouping of a plurality of data descriptors maintained or stored in a descriptor queue in system memory. For these examples, D0 to D15 may represent 16 separate memory address slots of a descriptor queue (e.g. descriptor queue 221-1) and QD0 to QD15 may represent 16 separate memory address slots of a QD queue (e.g., QD queue 214-1) included in an SM queue pair (e.g. SM queue pair 210-1).

According to some examples, SM queue pair structure 300 may be arranged such that one QD slot is assigned for every D slot (e.g., descriptor queue length=QD queue length). Also, a rule may be established that requires QD slots of the QD queue to be located in system memory in memory addresses that follow right after/are contiguous to a memory address of the last D slot of the descriptor queue. For example, a memory address for QD0 of the QD queue follows right after or is contiguous to the last memory address for D15 of the descriptor queue. This rule will eliminate a need for memory address information for specific slots of the QD queue to be included with QD information. In some examples, elimination of the memory address information may reduce information stored to separate QD slots by several bytes (e.g., around 8 bytes).

In some examples, SM queue pair structure 300 having an arrangement or configuration of one QD slot for every D slot may prevent the QD queue from overflowing. Thus, a need for head/tail tracking of the QD queue may be eliminated. It is noted that SM Queue pair structure 300 is one example of an arrangement of memory addresses for an SM queue pair. In other examples, descriptor queues and QD queues may be maintained in non-contiguous memory addresses included in system memory.

FIG. 4 illustrates an example doorbell format 400. In some examples, doorbell format 400 may include multiple fields shown in FIG. 4 as a tail 410, a doorbell type 420, a data length 430, a number of packets 440 or a QD completed 450. For these examples, a doorbell using the example doorbell format 400 may be generated by logic and/or features of a computing platform to provide information related to SM queue pairs maintained in a system memory of the computing platform. For example, queue pair logic 112 of computing platform 105 may generate doorbells using example doorbell format 400 to provide information related to SM queue pairs 212-1 to 212-n maintained in system memory 120 as shown in FIG. 2. In some examples, the doorbells may be sent to logic and/or features at NIC 150 such as QD logic 157. QD logic 157 may use that information to obtain QDs from SM queue pairs 212-1 to 212-n to facilitate scheduling of data from computing platform 105 by Tx scheduler 155. A doorbell in the example doorbell format 400 may include around 32 bits of information. Examples are not limited to 32 bit doorbells.

According to some examples, tail 410 may include information to indicate a first data descriptor stored to a descriptor queue. The indication may include a memory address for a given slot of the descriptor queue. As mentioned above, each data descriptor included in a slot of the descriptor queue may be associated with a transmit queue holding data awaiting scheduling for transmission. In other words, data descriptor tail information included in tail 410 may provide a relative descriptor index to a beginning of the transmit queue. The beginning marking the most recent data that awaits scheduling for transmission from the transmit queue. As described more below, information included in tail 410 may be used with other information included in a doorbell in example doorbell format 400 to locate a physical address of the slot in QD queue associated with the doorbell.

In some examples, doorbell type 420 may include information to indicate a type of doorbell. For example, doorbell type 420 may indicate that a doorbell sent using example doorbell format 400 is a schedule synchronization order (SSO) doorbell, a large send offload (LSO) doorbell or is a drop doorbell. An SSO doorbell may be the most commonly used doorbell type when communicating information regarding SM queue pairs having a descriptor queue and a QD queue.

According to some examples, data length 430 may indicate a data length of the data to be incorporated in a current doorbell. The indicated data length may be based on how many separate data descriptors have been grouped for a QD at the time the doorbell was generated and sent. For example, if three data descriptors stored in three slots of the descriptor queue were grouped for the QD, then the indicated data length would correspond to the amount of cumulative data to be scheduled for transmission that is associated with those three data descriptors. In some examples, each bit value indicated in data length 430 may equate to a data length of 64 bytes, rounded up. So, if the amount of cumulative data was 65 bytes, data length 430 would indicate a bit value of 2.

In some examples, number of packets 440 may indicate a number of packets incorporated in a current doorbell. Similar to data length, the indicated number of packets may be based on the separate data descriptors grouped for the QD at the time the doorbell was generated and sent. For example, if three data descriptors stored in three slots of the descriptor queue were grouped for the QD, then the indicated number of packets would correspond to a cumulative total of all packets needed to transmit data for which the three data descriptors are respectively associated with. According to some examples, number of packets 440 field may indicate from 1-63 packets (e.g., a 5 bit value) may be included in the QD. Examples are not limited to 1-63 packets being included in a QD.

According to some examples, QD completed 450 may indicate whether the current doorbell closes or completes a QD. For example, a bit value of 1 may indicate that the descriptor queue has received all data descriptors grouped with the QD. A bit value of 0 may indicate that the QD is incomplete and additional doorbells may be received until a doorbell in example doorbell format 400 is received that has a bit value of 1 in QD completed field 450.

In some examples, each data descriptor may be associated with data to be transmitted in a respective single data packet. For these examples, information included in tail 410 and number of packets 440 may be used to locate a physical address of the slot in the QD queue associated with the doorbell. The ability to locate the physical address using information included in tail 410 may be based on this single packet to data descriptor association and based on implementation of a rule to arrange an SM queue pair structure that requires slots of the QD queue to be located in system memory in memory addresses that follow right after or are contiguous to a memory address of a last slot of the descriptor queue as mentioned above for example SM queue pair structure 300. Thus, use of the memory address for the first data descriptor indicated in tail 410 and number of packets indicated in number of packets 440 may be used to locate the memory address of the slot in the QD queue for which that first data descriptor has been grouped. For example, if tail 410 indicates a first memory address and number of packets 440 indicates 3 packets, then the memory address of the head of the grouping of data descriptors is located 2 slots below the descriptor queue slot for the first data descriptor. Once the address of the head of the group of data descriptors is determined, the address of the slot of the QD queue may be determined based on the above mentioned rule implementation.

FIG. 5 illustrates an example QD format 500. In some examples, as shown in FIG. 5, QD format 500 may include multiple fields such as, but not limited to, a type 510, descriptors 520, a data length 530, a number of packets 540 or an expire time stamp 550. For these examples, QD format 500 may indicate information included or stored in a slot of a QD queue included in an SM queue pair maintained in a system memory of a computing platform (e.g., system memory 120) and/or stored in a QD cache (e.g., QD cache 250) included in a memory located on a NIC. In some examples, at least some of the information included in a QD stored to the QD queue or QD cache in the example QD format 500 may be similar to information indicated in a doorbell generated for a QD stored to the QD queue or QD cache. QD format 500 may, in some examples, be referred to as a type of schedule synchronization order (SSO) QD format. Also, a QD in example QD format 500 may include around 64 bits or 8 bytes of information. Examples are not limited to 64 bits.

According to some examples, type 510 may indicate a QD type for the QD. For example, a bit value of 0 included in type 510 may indicate the QD is a single send QD.

In some examples, descriptors 520 may indicate how many data descriptors are grouped with the QD. Descriptors 520 may have a bit value that indicates from 1-63 data descriptors may be grouped with the QD. Examples are not limited to 1-63 data descriptors.

According to some examples, data length 530 may indicate a cumulative data length of all the data associated with the data descriptors from slots of a descriptor queue grouped with the QD. For example, if 10 data descriptors from 10 slots of the descriptor queue were indicated as being grouped with the QD, then a cumulative data length for respective blocks of data associated with the 10 data descriptors will be indicated in data length 530. In some examples, each bit value indicated in data length 530 may equate to a data length of 64 bytes, rounded up.

In some examples, number of packets 540 may indicate a number of packets associated with the data descriptors grouped with the QD. Similar to data length, the indicated number of packets may be based on the separate data descriptors grouped for the QD. For example, if three data descriptors stored in four slots of the descriptor queue were grouped for the QD, then the indicated number of packets would correspond to a cumulative total of all packets needed to transmit data for which the four data descriptors are respectively associated with. According to some examples, number of packets 540 field may indicate from 1-63 packets (e.g., a 5 bit value) may be included in the QD. Examples are not limited to 1-63 packets being included in a QD. Also, in some examples, a single packet may be spread over multiple data descriptors. Thus, blocks of data for each of the multiple data descriptors may represent portions of the single packet.

According to some examples, expire time stamp 550 may indicate a time after which the QD may expire. For these examples, the time stamp may be based a time period that considers an acceptable amount of time for which data may wait before being selected for scheduling by a Tx scheduler of a NIC. The period of time may also be based on a size of the QD queue or cache. Larger capacity QD queues or caches may allow for longer period of time for a QD to remain in a QD queue or cache before expiring compared to smaller capacity QD queues.

In some examples, time stamp drop flag 560 may indicate to logic and/or features of a NIC such as QD logic 157 of NIC 150 to compare the expire time stamp included in expire time stamp 550 to an internal time stamp (e.g., maintained at NIC 150) and then drop the QD if needed. In other words, if time stamp drop flag 560 is asserted, QD logic 157 looks at the time indicated in expire time stamp 550 to determine if the internal time stamp matches or exceeds the time stamp. If matched or exceeded, QD logic 157 may drop the QD from the QD cache and/or cause the QD to be dropped from the QD queue from which the QD was fetched. If the time stamp drop flag 560 is not asserted, QD logic 157 may ignore the time stamp included in expire time stamp 550.

Figure 6:
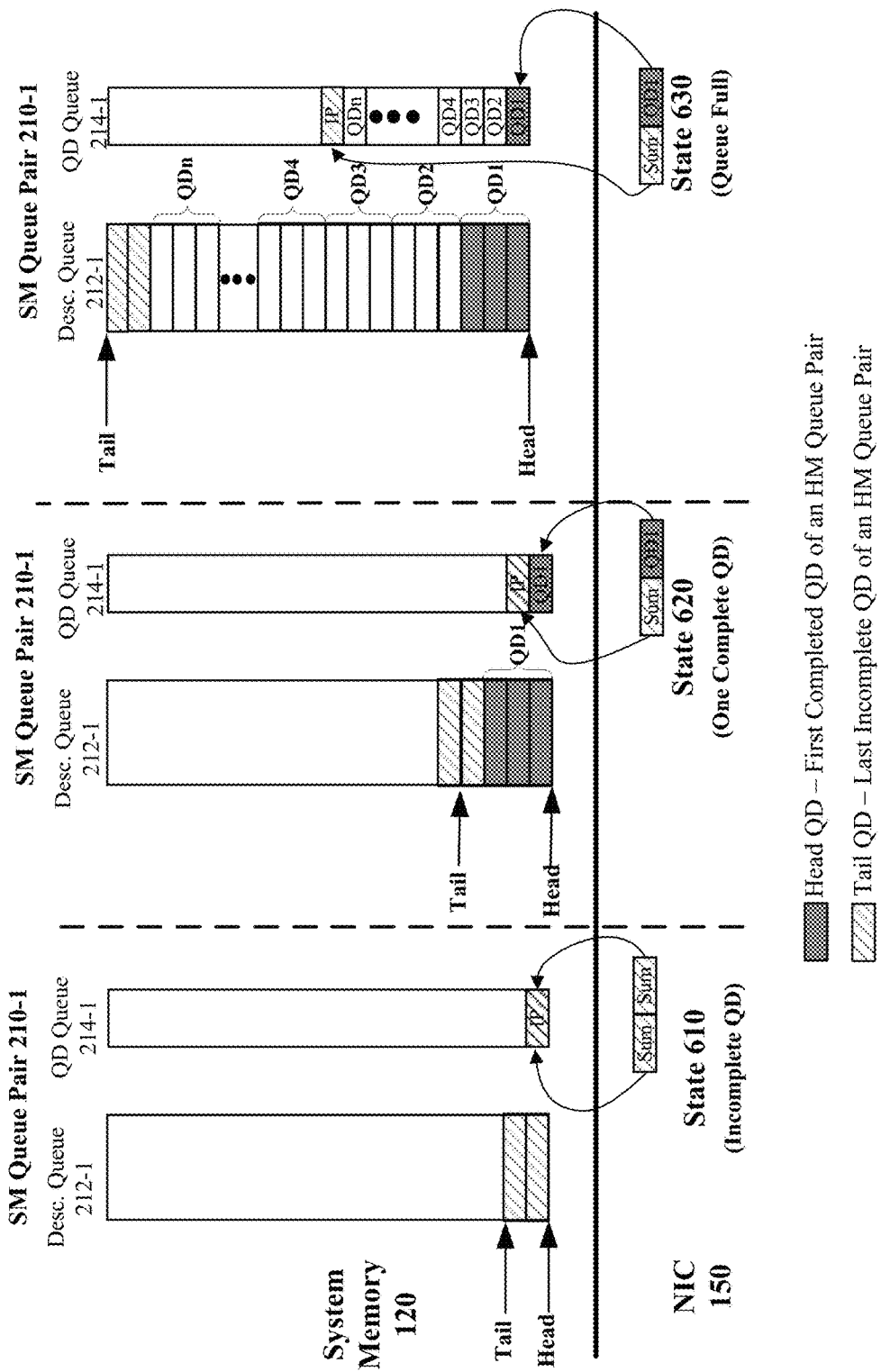
FIG. 6 illustrates example quanta descriptor states.

FIG. 6 illustrates example QD states 600. In some examples, as shown in FIG. 6, QD states 600 include states 610, 620 and 630. For these examples, states 610, 620 and 630 may be for SM queue pair 210-1 located in system memory 120 and reflect states of one or more QDs as those QDs are completed via filling of slots of descriptor queue 212-1 that store data descriptors grouped with respective QDs in slots of QD queue 214-1. States 610, 620 and 630 may also reflect a state or status of QDs for which information is stored to a memory at NIC 150 (e.g., in QD cache 250) following an exchange of a doorbell (e.g., in doorbell format 400) generated by logic and/or features of computing platform 105 (e.g., queue pair logic 112) and received by logic and/or features of NIC 150 (e.g., QD logic 157).

According to some examples, state 610 shows an example of an incomplete QD. For these examples, diagonal fill patterns for slots in SM queue pair 210-1 are related to a tail QD or a last incomplete QD of SM queue pair 210-1. State 610 depicts no complete QDs for SM queue pair 210-1 and shows that a slot for a future QD is in-process (IP). In other words, no QD stored to QD queue 214-1 has received all of the data descriptors grouped with a respective QD. The double "sum" blocks at NIC 150 may indicate that logic and/or features of NIC 150 (e.g., QD logic 157) have been notified (e.g., via a doorbell) that a QD is being built and consider the QD slot for that QD in QD queue 214-1 to be in-process until a doorbell is received that indicates the QD is complete.

In some examples, state 620 shows an example of one completed QD. For these examples, solid fill patterns for slots in SM queue pair 210-1 are related to a head QD or a first completed QD of SM queue pair 210-1. State 620 depicts that QD1 in the first slot of QD queue 214-1 is completed and the three slots of descriptor queue 212-1 for data descriptors grouped with QD1 are stored to those three slots. Also, the single "sum" block at NIC 150 indicates that the next slot of QD queue 214-1 is in process and the diagonal line fill patterns for slots of descriptor queue 212-1 indicate slots for which descriptor data has yet to be received. The solid fill pattern for the QD1 block at NIC 150 shown in FIG. 6 indicates that logic and/or features of NIC 150 have been notified (e.g., via a doorbell) that QD1 is complete. The logic and/or features may then obtain information from the slot for QD1 from QD pair 214-1 and store that information for QD1 to a memory at NIC 150.

According to some examples, state 630 shows an example of a full descriptor queue 212-1 for SM queue pair 210-1. For these examples, similar to what is shown for state 620, solid fill patterns for slots in SM queue pair 210-1 are related to a head QD or a first completed QD of SM queue pair 210-1. State 630 further depicts that QD1 in the first slot of QD queue 214-1 is completed and the three slots of descriptor queue 212-1 for data descriptors grouped with QD1 are stored to those three slots. State 630 also shows that the tail pointer for descriptor queue 212-1 has moved to the last slot of descriptor queue 212-1 and thus indicates that all slots of descriptor queue 212-1 include descriptor data. State 630 also indicates that multiple slots of QD queue 214-1 have completed QDs. In other words, data descriptors grouped with QD2-QDn have been received in slots of descriptor queue 212-1.

In some examples, the single "sum" block at NIC 150 for state 630 indicates that the top slot of QD queue 214-1 above QDn is in process. Also, the diagonal line fill patterns for slots of descriptor queue 212-1 at the tail pointer, plus one slot below that tail pointer indicate that these two slots of descriptor queue 212-1 may have received descriptor data. However, not all descriptor data grouped with this QD located in a slot above QDn has been received. The lack of receiving the descriptor data is due to descriptor queue 210-1 being full. The solid fill pattern of the QD1 block at NIC 150 indicates that logic and/or features of NIC 150 have been notified that QD1 is complete. The logic and/or features may then obtain information for the QD1 from QD pair 214-1 and store the information to a memory at NIC 150. For these examples, information for QD1 may be feed to a Tx scheduler at NIC 150 (e.g., Tx scheduler 155) for selection for scheduling. Once selected, descriptor data grouped with QD1 may be flushed from descriptor queue 212-1 and thus free up slots to add new descriptor data grouped with the QD indicated as in process.

According to some examples, a challenge is faced when queue pair logic 112 exchanges doorbell information with QD logic 157 when a number of QDs stored to the memory at NIC 150 are near zero. For example, where QD cache 250 (from QD logic 157's perspective) contains no completed QDs and one or more incomplete QDs are in process. Information for the one or more partial or incomplete QDs may be fed to Tx scheduler 155 and QD logic 157 may be responsible to manage the "QD accumulation". This QD accumulation may include data descriptors/packets accumulated into QDs as data descriptors are received in SM queue pairs at system memory 120 and QDs stored to QD queues from among QD queues 214-1 to 214-n that are synched with a separate "QD accumulation" process by queue pair logic 112 via "QD Complete" indications sent via doorbells to QD logic 157. Note, that for an empty QD cache 250, a first packet for a partial or incomplete QD may be fed to Tx scheduler 155 for scheduling immediately (regardless of whether a "QD Complete" indication has been received) and the next packet availability for this partial or incomplete QD may not be known. This uncertainty may introduce a partial or incomplete scheduling phenomenon. For this partial or incomplete QD scheduling phenomenon, an implementation choice of whether to feed the next packet (or packets) to Tx scheduler 155 when it already has a partial or incomplete QD pending in Tx scheduler 155 or wait for its scheduling and then feed separate partial or incomplete QD to the Tx scheduler 155. Feeding the next packet immediately may improve the latency and performance of an almost empty QD cache case. However, this implementation choice may introduce a complexity of doing "QD accumulation" inside Tx scheduler 155 and may cause a race condition when the pending partial or incomplete QD feed to Tx scheduler 155 is selected at the same time when another packet for the same partial or incomplete QD is fed to Tx scheduler 155.

Figure 7:
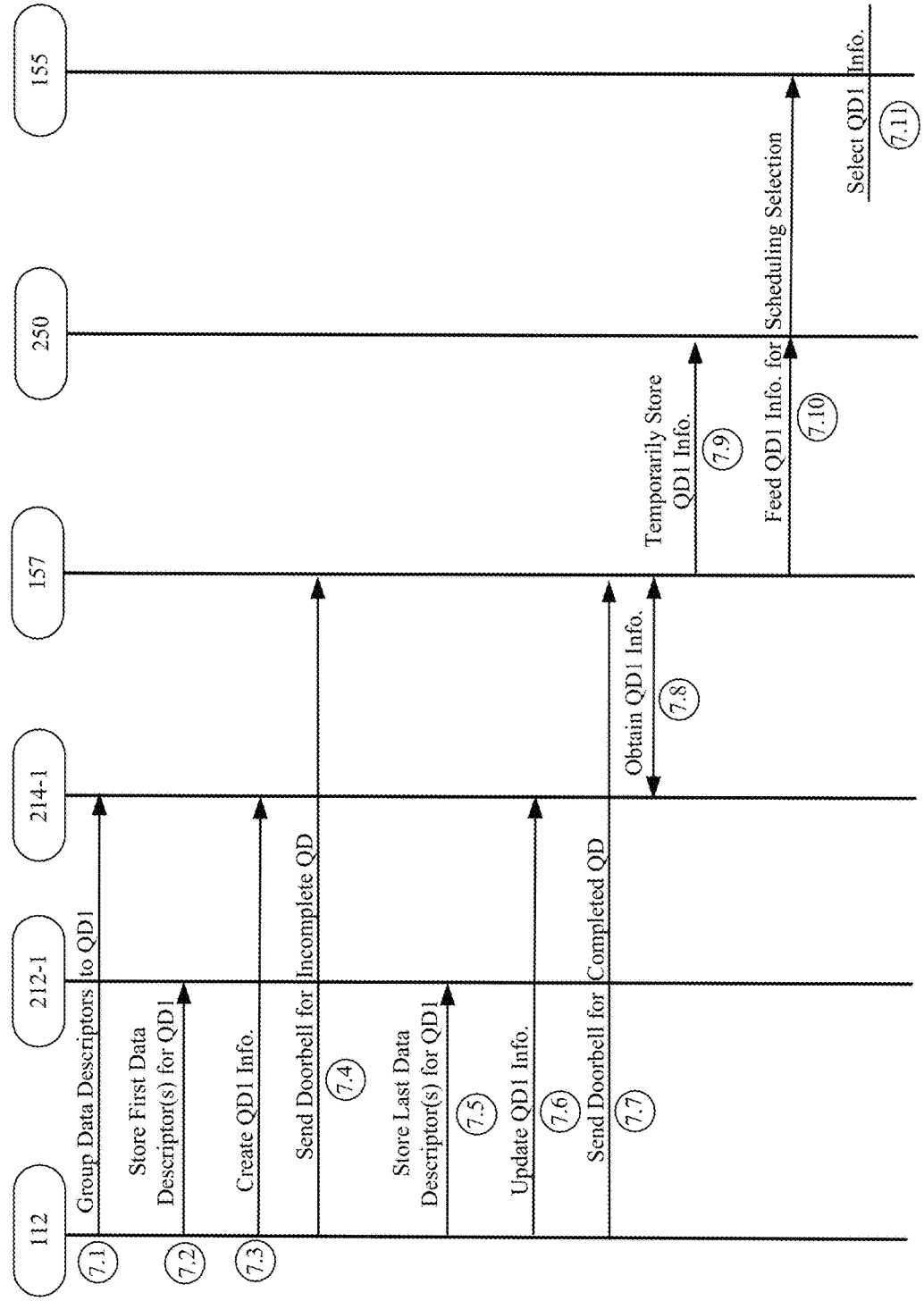
FIG. 7 illustrates an example process.

FIG. 7 illustrates an example process 700. According to some examples, process 700 depicts an example process of how information for a QD is obtained by logic and/or features of NIC and fed to Tx scheduler of the NIC to facilitate scheduling of data or packets transmitted from a computing platform coupled with the NIC. For these examples, elements of system 100 as shown in FIG. 1 or sub-system 200 shown in FIG. 2 may be related to process 700. These elements of system 100 may include, but are not limited to, computing platform 105, system memory 120, queue pair logic 112, descriptor queue 212-1, QD queue 214-1, NIC 150, QD logic 157, QD cache 250 or Tx scheduler 155.

Beginning at process 7.1 (Group Data Descriptors to QD1), queue pair logic 112 may group data descriptors for slots of descriptor queue 212-1 to a first slot of QD queue 214-1 identified in FIG. 2 as QD1. In some examples, the number of data descriptors grouped with QD1 may be based on a cumulative data length and/or a packet threshold for packets associated with grouped data descriptors. For example, if a data length threshold of 1,000 bytes was used to group data descriptors, then queue pair logic 112 would monitor cumulative data lengths for data descriptors grouped with QD1 as each data descriptor is stored to descriptor queue 212-1. Queue pair logic 112 would stop grouping data descriptors once the cumulative data length threshold of 1,000 bytes was reached. The data length threshold of 1,000 bytes may be based, at least in part, on how often Tx scheduler 155 selects QDs for scheduling and/or a data throughput of a selected link from among link(s) 160 coupled with computing platform 105 through which packets are scheduled for transmission.

Moving to process 7.2 (Store First Data Descriptor(s) for QD1), queue pair logic 112 may cause one or more first data descriptors for QD1 to be stored in descriptor queue 212-1. According to some examples, the one or more first data descriptors may be associated with a cumulative data size that is less than the data threshold (e.g., less than 1,000 bytes).

Moving to process 7.3 (Create QD1 Info.), queue pair logic 112 may create or generate information to be included in the first slot of QD queue 224-1. In some examples, the created information may include information as described above for example QD format 500 (see FIG. 5).

Moving to process 7.4 (Send Doorbell for Incomplete QD), queue pair logic 112 may generate and send a doorbell in the format of example doorbell format 400 to QD logic 157 at NIC 150. According to some examples, this doorbell may indicate that QD1 is incomplete. For these examples, an incomplete indication is based on the cumulative data size associated with the first data descriptor(s) not yet reaching the data threshold.

Moving to process 7.5 (Store Last Data Descriptor(s) for QD1), queue pair logic 112 may cause one or more last data descriptors for QD1 to be stored in descriptor queue 212-1. In some examples, the one or more last data descriptor(s) are referred to as "last" data descriptor(s) due to a cumulative data size exceeding the data threshold. For these examples, a tail pointer indicating the end of the grouping of data descriptors may mark the data descriptor stored just prior to exceeding the data threshold.

Moving to process 7.6 (Update QD1 Info.), queue pair logic 112 may update information included in the first slot of QD queue 224-1. In some examples, the update may be to information included in example QD format 500 that was created in process 7.3.

Moving to process 7.9 (Send Doorbell for Complete QD), queue pair logic 112 may generate and send a doorbell in the format of example doorbell format 400 to QD logic 157 at NIC 150. According to some examples, this doorbell may indicate that QD1 is complete. For these examples, a complete indication is based on the cumulative data size associated with the first data descriptor(s) reaching the data threshold.

Moving to process 7.10 (Obtain QD1 Info.), QD logic 157 may use information in this second doorbell sent by queue pair logic 112 to obtain the updated QD1 information from the slot of QD queue 214-1.

Moving to process 7.11 (Temporarily Store QD1 Info.), QD logic 157 may cause the obtained QD1 information to be at least temporarily stored in QD cache 250. According to some examples, the QD1 information stored in QD cache 250 may now be deemed as a completed QD.

Moving to process 7.12 (Feed QD1 Info. for Scheduling Selection), QD logic 157 may cause QD1 information stored in QD cache 250 to be fed to Tx scheduler 155.

Moving to process 7.13 (Select QD1 Info.), Tx scheduler 155 may select QD1 information based on a selection algorithm (e.g., round robin). In some examples, Tx scheduler 155 may use QD1 information to schedule data associated with the data descriptors associated with QD1 for transmission from computing platform 105. Process 700 then comes to an end.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates an example logic flow 800. Logic flow 800 may be representative of some or all of the operations executed by one or more logic, features, or devices of a computing platform coupled with a NIC such as computing platform 105 coupled with NIC 150. More particularly, logic flow 800 may be implemented by logic and/or features of queue pair logic 112.

According to some examples, logic flow 800 at block 802 may cause, at circuitry for a computing platform, a first plurality of data descriptors to be separately stored to individual memory address slots of a first queue maintained in system memory of the computing platform, the first plurality of data descriptors separately associated with first blocks of data. For these examples, queue pair logic 112 may cause the first plurality of data descriptors to be separately stored.

In some examples, logic flow 800 at block 804 may group the first plurality of data descriptors with a first descriptor, the first descriptor to include information to indicate a number of data descriptors grouped with the first descriptor, a cumulative data length of the first blocks of data and a number of packets to transmit the first blocks of data from the computing platform. For these examples, queue pair logic 112 may group the first plurality of data descriptors with the first descriptor.

According to some examples, logic flow 800 at block 806 may cause the first descriptor to be stored to a first memory address slot of a second queue maintained in the system memory. For these examples, queue pair logic 112 may cause the first descriptor to be stored to the first memory address slot.

In some examples, logic flow 800 at block 808 may send, to circuitry for a NIC coupled with the computing platform, information to indicate to the circuitry for the NIC how to obtain the first descriptor from the first memory address slot of the second queue. For these examples, queue pair logic 112 may send the information.

FIG. 9 illustrates an example logic flow 900. Logic flow 900 may be representative of some or all of the operations executed by one or more logic, features, or devices of circuitry for a NIC such as NIC 150 coupled with computing platform 105. More particularly, logic flow 900 may be implemented by logic and/or features of QD logic 157 or Tx scheduler 155.

According to some examples, logic flow 900 at block 902 may receive, at circuitry for a NIC coupled with a computing platform, information to indicate how to obtain a first descriptor from a first memory address slot of a first queue maintained in system memory of the computing platform, the first descriptor grouped with a first plurality of data descriptors stored in a second queue maintained in the system memory, the first plurality of data descriptors separately associated with first blocks of data, the first descriptor to include information to indicate a number of data descriptors grouped with the first descriptor, a cumulative data length of the first blocks of data and a number of packets to transmit the first blocks of data from the computing platform. For these examples, QD logic 157 may the information.

In some examples, logic flow 900 at block 904 may obtain the first descriptor from the first queue based on the received information. For these examples, QD logic 157 may obtain the first descriptor.

According to some examples, logic flow 900 at block 906 may schedule transmission of the first blocks of data from the computing platform based on information included in the first descriptor. For these examples, Tx scheduler 155 may schedule the transmission of the first blocks of data based on the information included in the first descriptor. The information included in the first descriptor, in some examples, may be fed to Tx scheduler 155 from QD logic 157.

FIG. 10 illustrates an example storage medium 1000. In some examples, storage medium 1000 may be an article of manufacture. Storage medium 1000 may include any non-transitory computer readable medium or machine readable medium, such as an optical, magnetic or semiconductor storage. Storage medium 1000 may store various types of computer executable instructions, such as instructions to implement logic flow 800 or logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
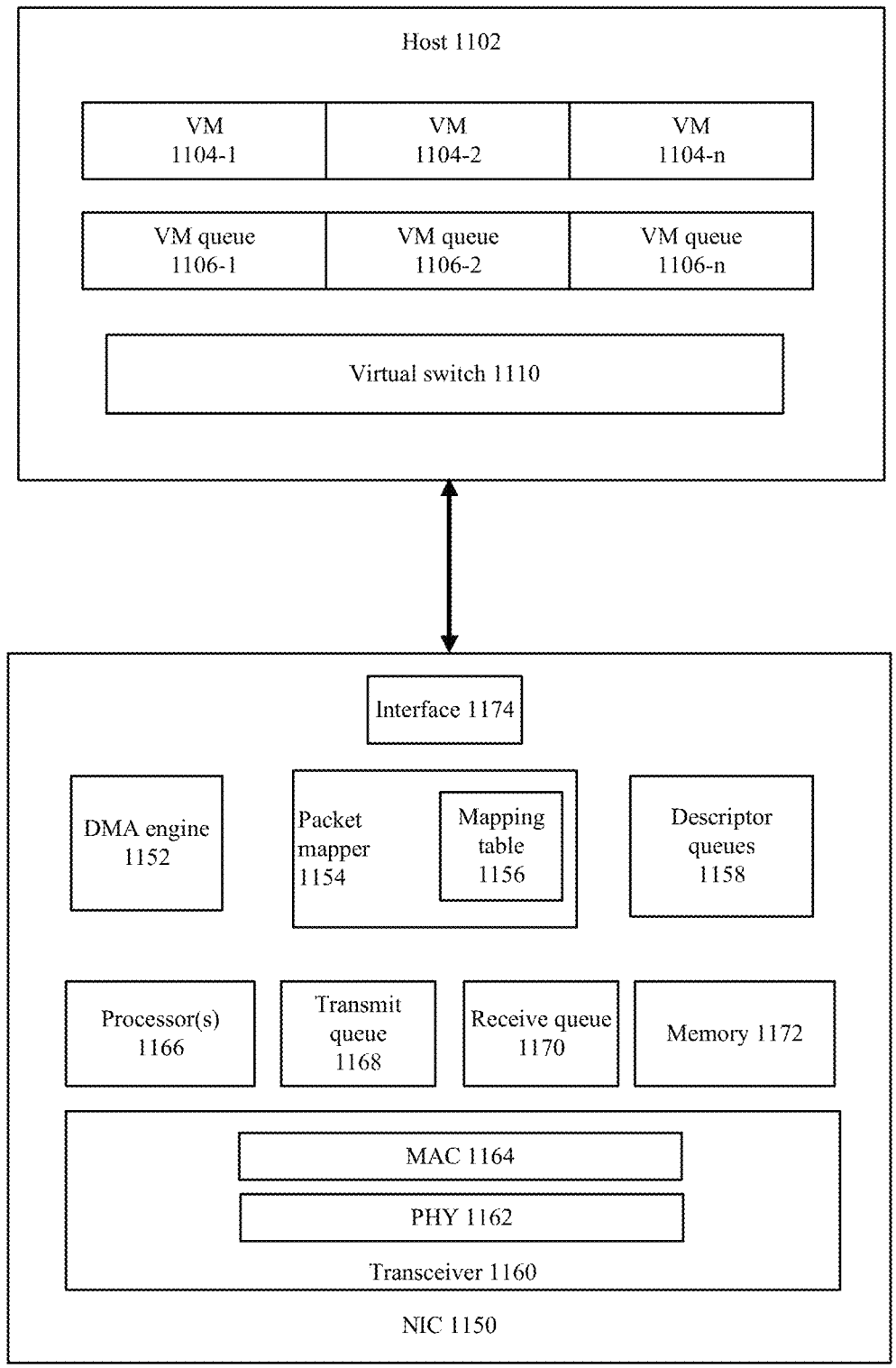
FIG. 11 illustrates an example second system.

FIG. 11 illustrates and example system 1100. In some examples, as shown in FIG. 11, system 1100 may include a host 1102. Host 1102 may be any computing platform with compute, interconnect, memory, storage, and network resources (not shown). For example, host 1102 may include one or more processors, interconnects, one or more memory, one or more storage devices, and one or more network interfaces. Host 1102 may support one or more virtual machines (VMs) 1104 to 1104-*n*. VMs 1104-1 to 1104-N may be any VM supported by host 1102. Also, VM queues 1106-1 to 1106-*n* may be associated with respective VMs 1104-1 to 1104-N and may be included in memory resources maintained by host 1102.

According to some examples, for a packet transmission, virtual switch 1110 may detect that a transmit packet and/or descriptor is formed in a VM queue and a virtual switch 1110 supported by host 1102 may request the packet header, payload, and/or descriptor be transferred to a NIC 1150 using a direct memory access (DMA) engine 1152 located at NIC 1150. For these examples, descriptor queues 1158 may receive the descriptor for the packet to be transmitted. NIC 1150 may transmit the packet. For example, a packet may have a header that identifies the source of the packet, a destination of the packet, and routing information of the packet. A variety of packet protocols may be used, including, but not limited to Ethernet, FibreChannel, Infiniband, or Omni-Path. Host 1102 may transfer a packet to be transmitted from a VM queue from among VM queues 1106-1 to 1106-*n* to NIC 1150 for transmission without use of an intermediate queue or buffer.

In some examples, a virtual switch 1110 supported by host 1102 may monitor properties of the transmitted packet header to determine if those properties are to be used to cause an update to a mapping table 1156 or add a mapping in mapping table 1156. According to some examples, to program a mapping table, a source IP address of a packet may be transmitted from VM 1104-1. For these examples, a mapping is created in mapping table 1156 between that source IP address and VM queue 1106-1 is assigned for that mapping. A packet received by NIC 1150 with a destination IP address equal to the value of the source IP address of VM 1104-1 is placed in mapped VM queue 1106-1. Also, for these examples, the source IP address is used to program the mapping, but it is the destination IP address that is an inspected characteristic or property of packets received on the network card, to determine where to route these packets. Thereafter, a received packet having a property or properties that match the mapping rule is transferred from network interface 1150 to VM queue 1106-1 using DMA engine 1152. For example, if VM 1104-1 requests packet transmission from a source IP address of 2.2.2.2, and if no mapping rule for VM 1104-1 is in mapping table 1156, then virtual switch 1110 may add a mapping of a received packet with a destination IP address of 2.2.2.2 to VM queue 1106-1, which is associated with VM 1104-1.

Virtual switch 1110 may be any software and/or hardware device that provides one or more of: visibility into inter-VM communication; support for Link Aggregation Control Protocol (LACP) to control the bundling of several physical ports together to form a single logical channel; support for standard 802.1Q VLAN model with trunking; multicast snooping; IETF Auto-Attach SPBM and rudimentary required LLDP support; BFD and 802.1ag link monitoring; STP (IEEE 802.1D-1998) and RSTP (IEEE 802.1D-2004); fine-grained QoS control; support for HFSC qdisc; per VM interface traffic policing; network interface bonding with source-MAC load balancing, active backup, and L4 hashing; OpenFlow protocol support (including many extensions for virtualization), IPv6 support; support for multiple tunneling protocols (GRE, VXLAN, STT, and Geneve, with IPsec support); support for remote configuration protocol with C and Python bindings; support for kernel and user-space forwarding engine options; multi-table forwarding pipeline with flow-caching engine; and forwarding layer abstraction to ease porting to new software and hardware platforms. A non-limiting example of virtual switch 1110 is Open vSwitch (OVS), described at https://www.openvswitch.org/.

An orchestrator, cloud operating system, or hypervisor (not shown) may be used to program virtual switch 1110. For example, OpenStack, described at https://www.openstack.org/can be used as a cloud operating system. The orchestrator, cloud operating system, or hypervisor can be executed on or supported by host 1102 or may be executed on or supported by a different physical computing platform.

According to some examples, for a received packet, NIC 1150 may use packet mapper 1154 to route received packets and/or associated descriptors to a VM queue supported by host 1102. Descriptor queues 1158 may be used to store descriptors of received packets. Packet mapper 1154 may use mapping table 1156 to determine which characteristics of a received packet to use to map to a VM queue. A VM queue can be a region of memory maintained by host 1102 that is able to be accessed by a VM. Content maintained or stored in the VM queue may be accessed in first-received-first-retrieved manner or according to any order that a VM requests. For example, a source IP address of 2.2.2.2 specified in a header of a received packet can be associated with VM queue 1106-1 in mapping table 1156. Based on mapping in mapping table 1156, NIC 1150 may use DMA engine 1152 to copy a packet header, packet payload, and/or descriptor directly to VM queue 1106-1, instead of copying the packet to an intermediate queue or buffer.

In some examples, as shown in FIG. 11, NIC 1150 may also include a transceiver 1160, processor(s) 1166, a transmit queue 1168, a receive queue 1170, a memory 1172, and a bus interface 1174. Transceiver 1160 may be capable of receiving and transmitting packets in conformance with applicable protocols such as Ethernet as described in IEEE 802.3, although other protocols may be used. Transceiver 1160 may receive and transmit packets from and to a network via a network medium or link. Transceiver 1160 may include PHY circuitry 1162 and MAC circuitry 1164. PHY circuitry 1162 may include encoding and decoding circuitry (not shown) to encode and decode data packets. MAC circuitry 1164 can be configured to assemble data to be transmitted into packets, that include destination and source addresses along with network control information and error detection hash values. Processor(s) 1166 can be any processor, core, graphics processing unit (GPU), or other programmable hardware device that facilitates programming of NIC 1150. For example, processor(s) 1166 may execute packet mapper 1154. Memory 1172 may be any type of volatile or non-volatile memory device and may at least temporarily store instructions used to program one or more elements of NIC 1150. Transmit queue 1168 may include data or references to data for transmission by NIC 1150. Receive queue 1170 may include data or references to data that was received by NIC 1150. Descriptor queues 1158 may reference data or packets in transmit queue 1168 or receive queue 1170. In some examples, descriptor queues 1158 that include transmit and receive queues 1168 and 1170 may be maintained in system memory for host 1102 rather than at NIC 1150. A bus interface 1174 may provide an interface with host 1102. For example, bus interface 1174 can be compatible with PCI, PCI Express, PCI-x, Serial ATA, and/or USB compatible interface (although other interconnection standards may be used).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof.

Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The follow examples pertain to additional examples of technologies disclosed herein.

Example 1

An example method may include receiving, at circuitry for a NIC coupled with a computing platform, information to indicate how to obtain a first descriptor from a first memory address slot of a first queue maintained in system memory of the computing platform. The first descriptor may be grouped with a first plurality of data descriptors stored in a second queue maintained in the system memory. The first plurality of data descriptors may separately be associated with first blocks of data to be scheduled for transmission from the computing platform. The first descriptor may include information to indicate a number of data descriptors grouped with the first descriptor, cumulative data length of the first blocks of data and a number of packets to transmit the first blocks of data. The method may also include obtaining the first descriptor from the first queue based on the received information. The method may also include scheduling transmission of the first blocks of data from the computing platform based on information included in the first descriptor.

Example 2

The method of example 1 may also include causing the first descriptor to be stored in a cache memory maintained at the NIC.

Example 3

The method of example 2 may also include receiving information to indicate whether the first descriptor is complete based on whether the cumulative data length of the first blocks of data has reached a data length threshold. The method may also include feeding the first descriptor to a scheduler for the NIC based on an indication of a completed first descriptor for the scheduler to use to schedule transmission of the first blocks of data from the computing platform.

Example 4

The method of example 1, the first blocks of data may be stored in a transmit queue maintained in the system memory.

Example 5

The method of example 1, the first queue and second queue may be arranged in a queue pair structure such that each queue of the queue pair structure includes an equal number of memory address slots and beginning memory address slots for the first queue are contiguous to a memory address slot for a last memory address slot of the second queue.

Example 6

The method of example 5, the information to indicate how to obtain the first descriptor from the first memory address slot of the second queue may also include a tail pointer to a memory address slot for the last data descriptor of the first plurality of data descriptors. The method may also include using the tail pointer to the memory address slot for last data descriptor to determine the first memory address slot of the second queue based on the queue pair structure.

Example 7

The method of example 1 may also include receiving, at circuitry for the NIC, second information to indicate how to obtain a second descriptor from a memory address slot of the first queue. The second descriptor may be grouped with a second plurality of data descriptors stored in the second queue. The second plurality of data descriptors may separately be associated with second blocks of data. The second descriptor may include information to indicate a number of data descriptors grouped with the second descriptor, a cumulative data length of the second blocks of data and a number of packets to transmit the second blocks of data from the computing platform. The method may also include obtaining the second descriptor from the first queue based on the received second information. The method may also include scheduling transmission of the second blocks of data from the computing platform based on information included in the second descriptor.

Example 8

The method of example 7, the first descriptor is a first quanta descriptor and the second descriptor is a second quanta descriptor.

Example 9

An example at least one machine readable medium may include a plurality of instructions that in response to being executed by a system may cause the system to carry out a method according to any one of examples 1 to 8.

Example 10

An example apparatus may include means for performing the methods of any one of examples 1 to 8.

Example 11

An example apparatus may include a cache memory. The apparatus may also include circuitry at a NIC coupled with a computing platform. The circuity may receive information to indicate how to obtain a first descriptor from a memory address slot of a first queue maintained in system memory of the computing platform. The first descriptor may be grouped with a first plurality of data descriptors stored in a second queue maintained in the system memory. The first plurality of data descriptors may separately be associated with first blocks of data. The first descriptor may include information to indicate a number of data descriptors grouped with the first descriptor, a cumulative data length of the first blocks of data and a number of packets to transmit the first blocks of data from the computing platform. The circuitry may also obtain the first descriptor from the first queue based on the received information. The circuitry may also cause the first descriptor to be stored in the cache memory. The circuitry may also schedule transmission of the first blocks of data from the computing platform based on information included in the first descriptor.

Example 12

The apparatus of example 11, the circuitry may also receive information to indicate whether the first descriptor is complete based on whether the cumulative data length of the first blocks of data has reached a data length threshold. The circuitry may also feed the first descriptor to a scheduler for the NIC based on an indication of a completed first descriptor to schedule transmission of the first blocks of data from the computing platform based on the information included in the first descriptor.

Example 13

The apparatus of example 11, the first blocks of data may be stored in a transmit queue maintained in the system memory.

Example 14

The apparatus of example 11, the first queue and second queue may be arranged in a queue pair structure such that each queue of the queue pair structure includes an equal number of memory address slots and beginning memory address slots for the first queue are contiguous to a memory address slot for a last memory address slot of the second queue.

Example 15

The apparatus of example 14, the information to indicate how to obtain the first descriptor from a first memory address slot of the second queue may include a tail pointer to a memory address slot for the last data descriptor of the first plurality of data descriptors. For this example, the circuitry may use the tail pointer to the memory address slot for last data descriptor to determine the first memory address slot of the second queue based on the queue pair structure.

Example 16

The apparatus of example 11, the first descriptor may include a first quanta descriptor.

Example 17

An example method may include causing, at circuitry for a computing platform, a first plurality of data descriptors to be separately stored to individual memory address slots of a first queue maintained in system memory of the computing platform. The first plurality of data descriptors may separately be associated with first blocks of data. The method may also include grouping the first plurality of data descriptors with a first descriptor. The first descriptor may include information to indicate a number of data descriptors grouped with the first descriptor, a cumulative data length of the first blocks of data and a number of packets to transmit the first blocks of data from the computing platform. The method may also include causing the first descriptor to be stored to a first memory address slot of a second queue maintained in the system memory. The method may also include sending, to circuitry for a NIC coupled with the computing platform, information to indicate to the circuitry for the NIC how to obtain the first descriptor from the first memory address slot of the second queue.

Example 18

The method of example 17, the circuitry for the NIC may use the information included in the first descriptor to schedule transmission of the first blocks of data from the computing platform.

Example 19

The method of example 17, the first blocks of data may be stored in a transmit queue maintained in the system memory.

Example 20

The method of example 17 may also include sending information to the circuitry for the NIC to indicate whether the first descriptor is complete based on whether the cumulative data length of the first blocks of data has reached a data length threshold.

Example 21

The method of example 17, the first queue and second queue may be arranged in a queue pair structure such that each queue of the queue pair structure includes an equal number of memory address slots and beginning memory address slots for the second queue are contiguous to a memory address slot for a last memory address slot of the first queue.

Example 22

The method of example 21, the information to indicate to the circuitry for the NIC how to obtain the first descriptor from the first memory address slot of the second queue may include a tail pointer to a memory address slot for the last data descriptor of the first plurality of data descriptors. For this example, the tail pointer to the memory address slot for last data descriptor may be capable of being used by the circuitry for the NIC to determine the first memory address slot of the second queue based on the queue pair structure.

Example 23

The method of example 17, the first descriptor may further include an expire time stamp to indicate a first time after which the first descriptor expires and a time stamp drop flag to indicate a comparison of the first time with a second time based on a time stamp generated by the circuitry for the NIC to determine whether the first descriptor has expired.

Example 24

The method of example 17 may also include causing, at circuitry for the computing platform, a second plurality of data descriptors to be separately stored to individual memory address slots of the first queue maintained, the second plurality of data descriptors separately associated with second blocks of data. The method may also include grouping the second plurality of data descriptors with a second descriptor. The second descriptor may include information to indicate a number of data descriptors grouped with the second descriptor, a cumulative data length of the second blocks of data and a number of packets to transmit the second blocks of data from the computing platform. The method may also include causing the second descriptor to be stored to a second memory address slot of the second queue. The method may also include sending, to the circuitry for the NIC, information to indicate to the circuitry for the NIC how to obtain the second descriptor from the second memory address slot of the second queue.

Example 25

The method of example 24, the first descriptor may be first quanta descriptor and the second descriptor may be a second quanta descriptor.

Example 26

An example at least one machine readable medium may include a plurality of instructions that in response to being executed by a system may cause the system to carry out a method according to any one of examples 17 to 25.

Example 27

An example apparatus may include means for performing the methods of any one of examples 17 to 25.

Example 28

An example apparatus may include system memory for a computing platform. The apparatus may also include circuitry for the computing platform. The circuity may cause a first plurality of data descriptors to be separately stored to individual memory address slots of a first queue maintained in the system memory. The first plurality of data descriptors may separately be associated with first blocks of data. The circuitry may also group the first plurality of data descriptors with a first descriptor. The first descriptor may include information to indicate a number of data descriptors grouped with the first descriptor, a cumulative data length of the first blocks of data and a number of packets to transmit the first blocks of data from the computing platform. The circuitry may also cause the first descriptor to be stored to a first memory address slot of a second queue maintained in the system memory. The circuitry may also send, to circuitry for a NIC coupled with the computing platform, information to indicate to the circuitry for the NIC how to obtain the first descriptor from the first memory address slot of the second queue.

Example 29

The apparatus of example 28, the circuitry for the NIC may use the information included in the first descriptor to schedule transmission of the first blocks of data from the computing platform.

Example 30

The apparatus of example 28, the first blocks of data may be stored in a transmit queue maintained in the system memory.

Example 31

The apparatus of example 28, the circuitry may also send information to the circuitry for the NIC to indicate whether the first descriptor is complete based on whether the cumulative data length of the first blocks of data has reached a data length threshold.

Example 32

The apparatus of example 28, the first queue and second queue may be arranged in a queue pair structure such that each queue of the queue pair structure includes an equal number of memory address slots and beginning memory address slots for the second queue are contiguous to a memory address slot for a last memory address slot of the first queue.

Example 33

The apparatus of example 32 may also include the information to indicate to the circuitry for the NIC how to obtain the first descriptor from the first memory address slot of the second queue includes a tail pointer to a memory address slot for the last data descriptor of the first plurality of data descriptors. For this example, the tail pointer to the memory address slot for last data descriptor may be capable of being used by the circuitry for the NIC to determine the first memory address slot of the second queue based on the queue pair structure.

Example 34

The apparatus of example 33, the first descriptor may further include an expire time stamp to indicate a first time after which the first descriptor expires and a time stamp drop flag to indicate a comparison of the first time with a second time based on a time stamp generated by the circuitry for the NIC to determine whether the first descriptor has expired.

Example 35

The apparatus of example 28, the first descriptor may be a first quanta descriptor.

Example 36

An example at least one machine readable medium may include a plurality of instructions that in response to being executed by a system at a computing platform cause the system to cause a first plurality of data descriptors to be separately stored to individual memory address slots of a first queue maintained in system memory of the computing platform. The first plurality of data descriptors may separately be associated with first blocks of data. The instructions may also cause the system to group the first plurality of data descriptors with a first descriptor. The first descriptor may include information to indicate a number of data descriptors grouped with the first descriptor, a cumulative data length of the first blocks of data and a number of packets to transmit the first blocks of data from the computing platform. The instructions may also cause the system to cause the first descriptor to be stored to a first memory address slot of a second queue maintained in the system memory. The instructions may also cause the system to send, to circuitry for a NIC coupled with the computing platform, information to indicate to the circuitry for the NIC how to obtain the first descriptor from the first memory address slot of the second queue.

Example 37

The at least one machine readable medium of example 36, the circuitry for the NIC may use the information included in the first descriptor to schedule transmission of the first blocks of data from the computing platform.

Example 38

The at least one machine readable medium of claim 36, the first blocks of data may be stored in a transmit queue maintained in the system memory.

Example 39

The at least one machine readable medium of example 36, may further include the instructions to cause the system to send information to the circuitry for the NIC to indicate whether the first descriptor is complete based on whether the cumulative data length of the first blocks of data has reached a data length threshold.

Example 40

The at least one machine readable medium of example 36, the first queue and second queue may be arranged in a queue pair structure such that each queue of the queue pair structure includes an equal number of memory address slots and beginning memory address slots for the second queue are contiguous to a memory address slot for a last memory address slot of the first queue.

Example 41

The at least one machine readable medium of example 40, may further include the information to indicate to the circuitry for the NIC how to obtain the first descriptor from the first memory address slot of the second queue includes a tail pointer to a memory address slot for the last data descriptor of the first plurality of data descriptors. For this example, the tail pointer to the memory address slot for last data descriptor may be capable of being used by the circuitry for the NIC to determine the first memory address slot of the second queue based on the queue pair structure.

Example 42

The at least one machine readable medium of example 36, the first descriptor may further include an expire time stamp to indicate a first time after which the first descriptor expires and a time stamp drop flag to indicate a comparison of the first time with a second time based on a time stamp generated by the circuitry for the NIC to determine whether the first descriptor has expired.

Example 43

The at least one machine readable medium of example 36, may further include the instructions to cause the system to cause a second plurality of data descriptors to be separately stored to individual memory address slots of the first queue maintained, the second plurality of data descriptors separately associated with second blocks of data. The instructions may also cause the system to group the second plurality of data descriptors with a second descriptor. The second descriptor may include information to indicate a number of data descriptors grouped with the second descriptor, a cumulative data length of the second blocks of data and a number of packets to transmit the second blocks of data from the computing platform. The instructions may also cause the system to cause the second descriptor to be stored to a second memory address slot of the second queue. The instructions may also cause the system to send, to the circuitry for the NIC, information to indicate to the circuitry for the NIC how to obtain the second descriptor from the second memory address slot of the second queue.

Example 44

The at least one machine readable medium of example 44, the first descriptor may be a first quanta descriptor and the second descriptor may be a second quanta descriptor.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    circuitry at a network interface card (NIC), the circuitry to:
        receive information to obtain a descriptor stored in a first transmit queue of a dual queue structure maintained in a memory at a computing platform, the descriptor to group at least one data descriptor stored in a second transmit queue of the dual queue structure, each data descriptor of the at least one data descriptor associated with a block of data to be transmitted;
        obtain the descriptor stored in the first transmit queue based on the received information;
        cause the descriptor to be stored in a memory maintained at the NIC; and
        schedule transmission of blocks of data associated with each of the at least one data descriptor responsive to the descriptor being stored in the memory maintained at the NIC.

2. The apparatus of claim 1, wherein the descriptor includes information to indicate a number of at least one data descriptors grouped with the descriptor, a cumulative data length of blocks of data to be transmitted, and a number of packets to transmit the blocks of data, the circuitry to:
    receive information to indicate whether the descriptor is complete based on whether the cumulative data length of the blocks of data has reached a data length threshold; and
    provide the descriptor to a scheduler for the NIC based on an indication of a completed descriptor to schedule transmission of the blocks of data using the information included in the descriptor.

3. The apparatus of claim 1, comprising the dual queue structure maintained in the memory at the computing platform is arranged such that each transmit queue of the dual queue structure includes an equal number of memory address slots and beginning memory address slots for the first transmit queue are contiguous to a memory address slot for a last memory address slot of the second transmit queue.

4. The apparatus of claim 3, further comprising:
    the information to obtain the descriptor stored in the first transmit queue includes a tail pointer to a memory address slot for a last data descriptor of the at least one data descriptor; and
    the circuitry to use the tail pointer to the memory address slot for the last data descriptor to determine a first memory address slot of the first transmit queue based on the dual queue structure arrangement.

5. The apparatus of claim 1, the descriptor comprises a quanta descriptor.

6. A method comprising:
    receiving, at circuitry for a network interface card (NIC), information to obtain a descriptor stored in a first transmit queue of a dual queue structure maintained in a memory at a computing platform, the descriptor to group at least one data descriptor stored in a second transmit queue of the dual queue structure, each data descriptor of the at least one data descriptor associated with a block of data to be transmitted;
    obtaining the descriptor stored in the first transmit queue based on the received information;
    causing the descriptor to be stored in a memory maintained at the NIC; and
    scheduling transmission of blocks of data associated with each of the at least one data descriptor responsive to the descriptor being stored in the memory maintained at the NIC.

7. The method of claim 6, wherein the descriptor includes information to indicate a number of at least one data descriptor grouped with the descriptor, a cumulative data length of blocks of data to be transmitted, and a number of packets to transmit the blocks of data, the method further comprising:
    receiving information to indicate whether the descriptor is complete based on whether the cumulative data length of the blocks of data has reached a data length threshold; and
    providing the descriptor to a scheduler for the NIC based on an indication of a completed descriptor for the scheduler to use to schedule transmission of the blocks of data using the information included in the descriptor.

8. The method of claim 6, comprising the block of data is stored in a transmit queue maintained in the memory at the compute platform.

9. The method of claim 6, comprising the dual queue structure maintained in the memory at the computing platform is arranged such that each transmit queue of the dual queue structure includes an equal number of memory address slots and beginning memory address slots for the first transmit queue are contiguous to a memory address slot for a last memory address slot of the second transmit queue.

10. The method of claim 9, further comprising:
the information to obtain the descriptor stored in the first transmit queue includes a tail pointer to a memory address slot for a last data descriptor of the at least one data descriptor; and
using the tail pointer to the memory address slot for the last data descriptor to determine a first memory address slot of the first transmit queue based on the dual queue structure arrangement.

11. The method of claim 6, further comprising:
receiving, at circuitry for the NIC, second information to obtain a second descriptor stored in the first transmit queue, the second descriptor to group a second at least one data descriptor stored in the second transmit queue, each data descriptor of the second at least one data descriptor associated with a block of data to be transmitted;
obtaining the second descriptor stored in the first transmit queue based on the received second information; and
scheduling transmission of the blocks of data associated with each of the second at least one data descriptor responsive to the second descriptor being stored in the memory maintained at the NIC.

12. The method of claim 11, comprising the descriptor is a first quanta descriptor and the second descriptor is a second quanta descriptor.

13. At least one non-transitory machine readable medium comprising a plurality of instructions that in response to being executed by a system at a computing platform cause the system to:
cause at least one data descriptor to be separately stored to individual memory address slots of a first transmit queue of a dual queue structure maintained in a memory at the computing platform, each data descriptor of the at least one data descriptor associated with a block of data to be transmitted from a network interface card (NIC);
group the at least one data descriptor with a descriptor;
cause the descriptor to be stored to a first memory address slot of a second transmit queue of the dual queue structure; and
send, to circuitry for the NIC, information to indicate to the circuitry for the NIC how to obtain the descriptor stored to the first memory address slot of the second transmit queue.

14. The at least one non-transitory machine readable medium of claim 13, comprising the circuitry for the NIC to use the information included in the descriptor to schedule transmission of blocks of data associated with each of the at least one data descriptor.

15. The at least one non-transitory machine readable medium of claim 13, further comprising the instructions to cause the system to:
send information to the circuitry for the NIC to indicate whether the descriptor is complete based on whether a cumulative data length of blocks of data to be transmitted has reached a data length threshold.

16. The at least one non-transitory machine readable medium of claim 13, comprising the dual queue structure maintained in the memory at the computing platform is arranged such that each transmit queue of the dual queue structure includes an equal number of memory address slots and beginning memory address slots for the first transmit queue are contiguous to a memory address slot for a last memory address slot of the second transmit queue.

17. The at least one non-transitory machine readable medium of claim 16, further comprising:
the information to indicate to the circuitry for the NIC how to obtain the descriptor stored to the first memory address slot of the second transmit queue includes a tail pointer to a memory address slot for a last data descriptor of the at least one data descriptor; and
the tail pointer to the memory address slot for the last data descriptor capable of being used by the circuitry for the NIC to determine the first memory address slot of the first transmit queue based on the dual queue structure arrangement.

18. The at least one non-transitory machine readable medium of claim 13, comprising the descriptor includes an expire time stamp to indicate a first time after which the descriptor expires and a time stamp drop flag to indicate a comparison of the first time with a second time based on a time stamp generated by the circuitry for the NIC to determine whether the descriptor has expired.

19. The at least one non-transitory machine readable medium of claim 13, further comprising the instructions to cause the system to:
cause a second at least one data descriptor to be separately stored to individual memory address slots of the first transmit queue maintained at the compute platform, each data descriptor of the second at least one data descriptor associated with a block of data to be transmitted from the NIC;
group the second at least one data descriptor with a second descriptor;
cause the second descriptor to be stored to a second memory address slot of the second transmit queue; and
send, to the circuitry for the NIC, information to indicate to the circuitry for the NIC how to obtain the second descriptor stored to the second memory address slot of the second transmit queue.

20. The at least one non-transitory machine readable medium of claim 19, comprising the descriptor is a first quanta descriptor and the second descriptor is a second quanta descriptor.

21. An apparatus comprising:
circuitry at a network interface card (NIC), the circuitry to:
receive information to obtain a descriptor stored in a first transmit queue of a dual queue structure maintained in a memory at a host computing platform;
obtain the descriptor stored in the first transmit queue based on the received information; and
schedule transmission of blocks of data associated with at least one data descriptor stored in a second transmit queue of the dual queue structure based on the descriptor indicating that the descriptor is grouped with the at least one data descriptor.

22. The apparatus of claim 21, wherein the descriptor includes information to indicate a number of at least one data descriptor grouped with the descriptor, a cumulative data length of the blocks of data to be transmitted, and a number of packets to transmit the blocks of data, the circuitry to:

receive information to indicate whether the descriptor is complete based on whether the cumulative data length of the blocks of data has reached a data length threshold; and cause the scheduling of the transmission of the blocks of data based on an indication of a completed descriptor.

23. The apparatus of claim 21, comprising the dual queue structure maintained in the memory at the host computing platform is arranged such that each transmit queue of the dual queue structure includes an equal number of memory address slots and beginning memory address slots for the first transmit queue are contiguous to a memory address slot for a last memory address slot of the second transmit queue.

24. The apparatus of claim 23, further comprising:

the information to obtain the descriptor stored in the first transmit queue includes a tail pointer to a memory address slot for a last data descriptor of the at least one data descriptor; and the circuitry to use the tail pointer to the memory address slot for last data descriptor to determine a first memory address slot of the first transmit queue based on the dual queue structure.

25. The apparatus of claim 21, the descriptor comprises a quanta descriptor.

* * * * *